United States Patent
Chopra et al.

(10) Patent No.: US 9,208,778 B2
(45) Date of Patent: *Dec. 8, 2015

(54) SYSTEM AND METHOD FOR COMBINING FRAME AND SEGMENT LEVEL PROCESSING, VIA TEMPORAL POOLING, FOR PHONETIC CLASSIFICATION

(71) Applicant: AT&T Intellectual Property I, L.P., Atlanta, GA (US)

(72) Inventors: Sumit Chopra, Jersey City, NJ (US); Dimitrios Dimitriadis, Jersey City, NJ (US); Patrick Haffner, Atlantic Highlands, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,400

(22) Filed: Nov. 10, 2014

(65) Prior Publication Data

US 2015/0058012 A1  Feb. 26, 2015

Related U.S. Application Data

(63) Continuation of application No. 13/281,102, filed on Oct. 25, 2011, now Pat. No. 8,886,533.

(51) Int. Cl.
*G10L 15/08* (2006.01)
*G10L 15/02* (2006.01)
*G10L 15/16* (2006.01)

(52) U.S. Cl.
CPC ............. *G10L 15/08* (2013.01); *G10L 15/02* (2013.01); *G10L 15/16* (2013.01)

(58) Field of Classification Search
USPC .............. 704/240, 235, 251, 270, 270.1, 257, 704/243, 255, 256.2; 370/336, 347
See application file for complete search history.

(56) References Cited

U.S. PATENT DOCUMENTS 4,977,599 A * 12/1990 Bahl et al. .................. 704/256.4
5,625,749 A    4/1997 Goldenthal et al.
(Continued)

FOREIGN PATENT DOCUMENTS

EP    1005019    11/1999

OTHER PUBLICATIONS

Chang et al., "Hierarchical Large-Margin Gaussian Mixture Models for Phonetic Classification", in IEEE Workshop on ASRU, 2007, pp. 272-277.

*Primary Examiner* — Vijay B Chawan

(57) ABSTRACT

Disclosed herein are systems, methods, and non-transitory computer-readable storage media for combining frame and segment level processing, via temporal pooling, for phonetic classification. A frame processor unit receives an input and extracts the time-dependent features from the input. A plurality of pooling interface units generates a plurality of feature vectors based on pooling the time-dependent features and selecting a plurality of time-dependent features according to a plurality of selection strategies. Next, a plurality of segmental classification units generates scores for the feature vectors. Each segmental classification unit (SCU) can be dedicated to a specific pooling interface unit (PIU) to form a PIU-SCU combination. Multiple PIU-SCU combinations can be further combined to form an ensemble of combinations, and the ensemble can be diversified by varying the pooling operations used by the PIU-SCU combinations. Based on the scores, the plurality of segmental classification units selects a class label and returns a result.

20 Claims, 6 Drawing Sheets

(56) References Cited

U.S. PATENT DOCUMENTS

| | | |
|---|---|---|
| 5,638,487 A | 6/1997 | Chigier |
| 7,603,267 B2 | 10/2009 | Wang et al. |
| 8,886,533 B2 * | 11/2014 | Chopra et al. ................ 704/240 |
| 2003/0023434 A1 | 1/2003 | Boman et al. |
| 2004/0122672 A1 | 6/2004 | Bonastre et al. |
| 2004/0220809 A1 * | 11/2004 | Wang et al. ................... 704/257 |
| 2006/0036444 A1 * | 2/2006 | Hwang ......................... 704/275 |
| 2006/0200253 A1 | 9/2006 | Hoffberg et al. |
| 2006/0206330 A1 * | 9/2006 | Attwater et al. ............. 704/252 |
| 2007/0055508 A1 | 3/2007 | Zhao et al. |
| 2010/0324896 A1 | 12/2010 | Attwater et al. |

* cited by examiner

SYSTEM AND METHOD FOR COMBINING FRAME AND SEGMENT LEVEL PROCESSING, VIA TEMPORAL POOLING, FOR PHONETIC CLASSIFICATION

PRIORITY DOCUMENT

The present application is a continuation of U.S. patent application Ser. No. 13/281,102, filed Oct. 25, 2011, the contents of which is incorporated herein by reference in its entirety.

BACKGROUND

1. Technical Field

The present disclosure relates to speech recognition and more specifically to combining frame and segment level processing, via temporal pooling, for phonetic classification.

2. Introduction

Traditional approaches for automatic speech recognition aim to recognize a sequence of events in an input. By focusing on a sequence of words or phoneme, these approaches greatly limit the range of solutions for automatic speech recognition. For example, traditional approaches can only use the acoustic features, measured at specific time intervals called frames, as input. Moreover, traditional models are typically only trained according to the maximum likelihood criterion.

The current models are based on one of two distinct approaches for automatic speech recognition: frame-based classification and segment-based classification. Frame-based classification models perform a frame-level analysis of the input to determine the structure and characteristics of the input. The classification performance for these models, however, is marked by significant error rates.

On the other hand, segment-based classification models perform a segment-level analysis of the input to determine the structure and characteristics of the input. Segment-based classification models assume that the boundaries of the input are known at test time. The features in the input are extracted at the segment level, and processed through a static architecture that has no concept of time. These models typically perform better than frame-based classification models. Nevertheless, segment-based classification models include significant drawbacks. First, segment-based classification models typically require hand tuning of the system to the task, which can be costly and inefficient. Second, such segmental approaches, when adapted to situations when no segment information is provided beforehand, often result in very high computational costs. These and other problems exist in current speech classification models.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein are based on a multi-layer model that combines both frame-based and segment-based processing, interfaced via a temporal pooling layer. The multi-layer model combines a frame level transformation of the signal with a segment level classification. To this end, the multi-layer model converts frame scores into segment scores to integrate the frame-based and segment-based classification approaches. The multi-layer model uses novel temporal pooling techniques over windows of variable lengths along the time dimension. This allows detection of patterns that span multiple frames. Diversity in pooling techniques is also used to generate different candidate classifiers. The classifiers can then be combined to form an ensemble of classifiers to boost classification performance. The frame processing unit can also be shared across segments and classifiers in the ensemble to limit the combinatorial explosion of computation to the segmental classification unit.

The multi-layer model provides significant performance improvements without relying on expert knowledge. Moreover, the multi-layer model offers significant practical advantages. For example, the multi-layer model is modular, having a frame-based layer, segment-based layer, and temporal pooling layer. This allows for greater customization and optimization for a particular task. Also, the multi-layer model enables a connected input recognition implementation where the majority of computation, which is performed at frame level, can be shared.

Disclosed are systems, methods, and non-transitory computer-readable storage media for combining frame and segment level processing, via temporal pooling, for phonetic classification. The multi-layer model performs frame-level processing of the input using a frame processing unit. The frame processor unit receives the input and extracts the time-dependent features from the input. The frame processor unit can include one or more temporal filters for extracting the time-dependent features. The output from the frame processing unit can be, for example, a feature map of the input.

An ensemble of pooling interface units receive the output from the frame processing unit and perform temporal pooling to extract the time-invariant features. The ensemble of pooling interface units generates feature vectors based on pooling the time-dependent features and selecting time-dependent features according to multiple selection strategies, called "pooling". The temporal pooling can be performed over multiple sub-segments (e.g., states) of the input, and the sub-segments can be generated according to multiple partitioning strategies. For instance, the input can be partitioned into three segments (two smaller segments on the sides and one larger segment in the middle). The ensemble of pooling interface units can perform a pooling operation over each of these segments independently of the other segments. A selection strategy ("pooling") can be based on one or more functions, rules, relationships, formulas, values, etc. For example, a selection strategy can be based on a max, average, or rectified average score.

Next, an ensemble of segmental classification units generates scores for the feature vectors. The scores can be, for example, conditional probabilities of classes. A segmental classification unit can be dedicated to a particular pooling interface unit to form a pooling interface unit (PIU) and segmental classification unit (SCU) combination (PIU-SCU). Multiple PIU-SCU combinations can be further combined to form an ensemble of combinations, and the ensemble of combinations can be diversified by varying the parameters and pooling strategies used by the PIU-SCU combinations.

Based on the scores, the ensemble of segmental classification units then selects a class label. For instance, the ensemble of segmental classification units can select the class label corresponding to the highest probability. Finally, the multi-layer model returns a result based on the class label. The result can be a class label, recognition candidate, representation of the input, etc. In one embodiment, the result is a vector of class labels.

The principles herein can be applied to speech recognition in any situation, as well as video recognition, gesture recognition, image recognition, content recognition, object recognition, character recognition, and so forth. Moreover, the result returned by the multi-layer model can be used for a variety of different applications, such as test-to-speech unit dictionary building, online continuous speech recognition, high confidence segmental rescoring, image identification, language identification, video identification, object identification, and so forth.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for improved approaches for performing phone classification for speech recognition. A brief introductory description of a basic general purpose system or computing device in FIG. 1 which can be employed to practice the concepts is disclosed herein. The disclosure then turns to a description of speech processing and related approaches. A more detailed description of the principles, architectures, and methods will then follow. These variations shall be discussed herein as the various embodiments are set forth. The disclosure now turns to FIG. 1.

Figure 1:
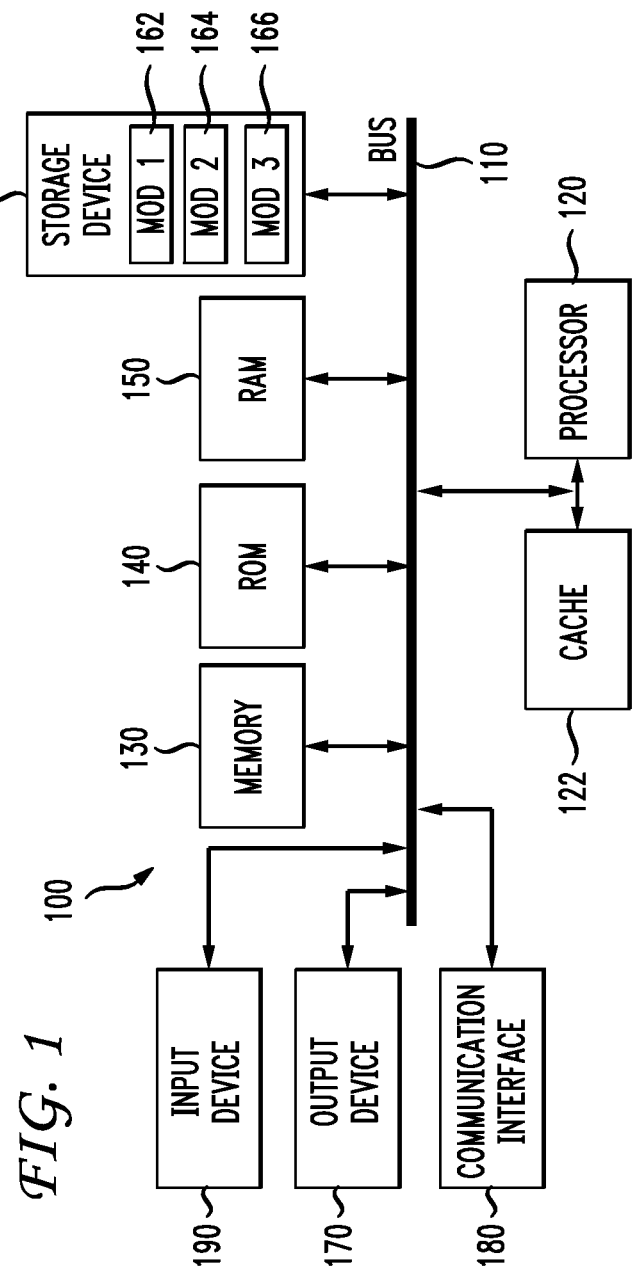
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
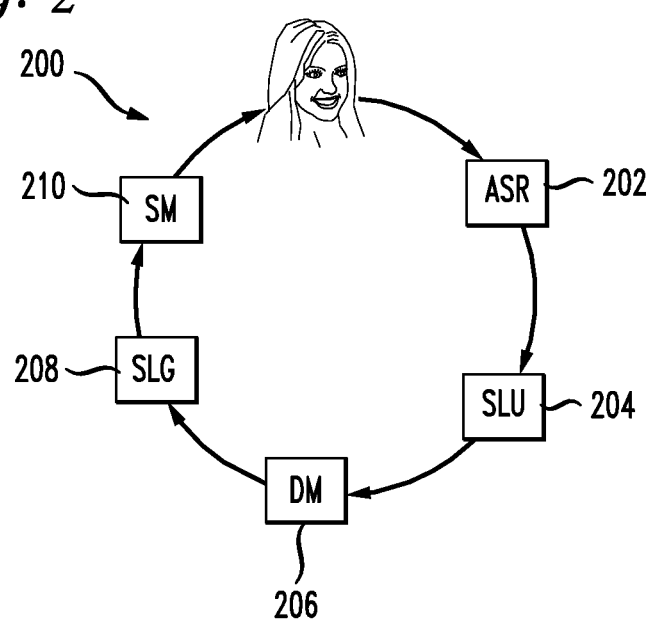
FIG. 2 illustrates a functional block diagram that illustrates an exemplary natural language spoken dialog system.

Having disclosed some components of a computing system, the disclosure now turns to FIG. 2, which illustrates an exemplary natural language spoken dialog system. FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and text-to-speech (TTS) module 210 which can be substituted by one or more other speech synthesis module. The TTS module can be any type of speech output module. For example, it can be a module wherein one prerecorded speech segment is selected and played to a user. Thus, the TTS module represents any type of speech output. The present disclosure focuses on innovations related to the ASR module 202 and can also relate to other components of the dialog system. For instance, pooling can also be used for the accurate selection of phonetic dictionary units in the TTS module.

The automatic speech recognition module 202 analyzes speech input and provides a textual transcription of the speech input as output. SLU module 204 can receive the transcribed input and use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The TTS module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training automatic speech recognition module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically classifying or rescoring segments of speech can join the system at any point or at multiple points in the cycle or can be integrated with any of the modules shown in FIG. 2. For instance, the ASR module can produce multiple phoneme sequence hypotheses, and they can be further rescored. Further, the speech recognition principles set forth below can be incorporated within this functional framework.

Figure 3:
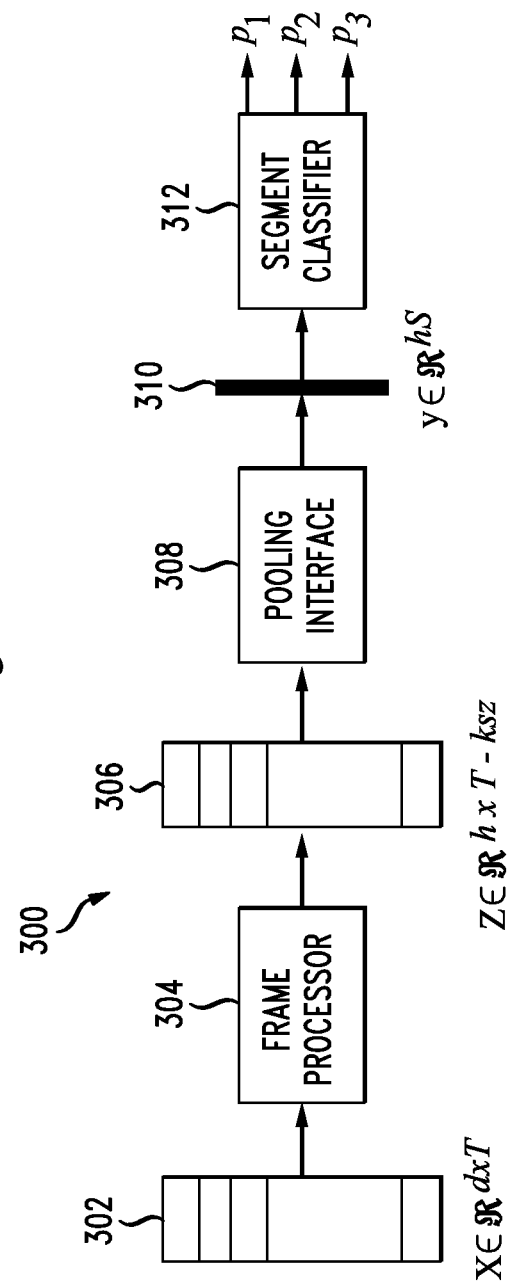
FIG. 3 illustrates a basic example of a multi-layer architecture that combines a frame-based and segment-based layer, interfaced via a temporal pooling layer.

Having described both a sample computing system and an exemplary natural language spoken dialog system, the disclosure now turns to FIG. 3, which illustrates a basic example of a multi-layer architecture 300 that combines a frame-based and segment-based layer, interfaced via a temporal pooling layer. The multi-layer architecture 300 includes a frame processor 304 at the frame-based layer, a pooling interface 308 at the temporal pooling layer, and a segment classifier 312 at the segment-based layer.

The frame processor 304 provides a frame-level transformation of a signal, such as a video signal, a digital signal, an analog signal, an acoustic signal, and so forth. The frame processor 304 includes one or more temporal filters, which it uses to extract time-dependent features from the input 302. In one aspect, the frame processor 304 includes a temporal filter bank and is configured to use a point-wise non-linearity function.

As shown in FIG. 3, the frame processor 304 first receives an input 302. The input 302 can be, for example, a signal; a sequence of frames in a segment; a segment of video, audio, data; a sequence of features in a segment; etc. In FIG. 3, the input 302 is a feature sequence associated with every frame extracted from pre-segmented phone segments. Here, the feature sequence from input 302 is represented by a matrix $X \in \mathfrak{R}^{d \times T}$, where d represents the d frame dimensions and T represents the number of frames associated with the phone segment, such that $X=[x_1, x_2, \ldots, x_T]$, where the j-th column of X represents the feature vector $x_j$ corresponding to the jth frame.

After receiving the input 302, the frame processor 304 extracts the time-dependent features from the input 302. In one embodiment, the frame processor 304 is configured to use a temporal filter to extract the time-dependent features from the input 302. In FIG. 3, the functionality of the frame processor 304 resembles the functionality of a standard Time Delay Neural Network (TDNN): the frame processor 304 takes as input a two dimensional feature map X and produces as output 306 another two dimensional feature map Z. Specifically, in this example, the output 306 of the frame processor 304 is a two dimensional map $Z=[z_1, z_2, \ldots, z_{(T-k+1)}]$, with $Z \in \Re^{h \times (T-k+1)}$, where h is the number of filters in the frame processor 304 and (T−k+1) represents the number of temporal features generated by the filters. In one aspect, the output 306 is then passed through a point-wise nonlinearity.

The pooling interface 308 receives the output 306 and begins a temporal pooling operation. In one embodiment, the pooling interface 308 divides the output 306 into sub-matrices before beginning the temporal pooling operation. For example, the pooling interface 308 can divide the matrix Z from output 306 along its columns, into S non-overlapping, contiguous sub-matrices, with the number of columns in the ratio of $(\alpha_1 : \ldots : \alpha_S)$ with $\Sigma \alpha_i = 1$. The pooling interface 308 can alternatively divide the matrix Z into S overlapping sub-matrices. The pooling interface 308 can then apply the temporal pooling operation to each of the sub-matrices independently.

The pooling interface 308 begins the temporal pooling operation by combining the components of the output 306. The pooling interface 308 extracts the time-invariant features from the combination using one or more selection strategies. A selection strategy can be based, for example, on one or more functions, rules, relationships, formulas, values, etc. In one aspect, the selection strategy is based on the total of all scores (e.g., confidence scores) computed over time for the time-dependent features in the output 306.

In FIG. 3, the pooling interface 308 applies an average pooling operation to the S sub-matrices, and generates a feature vector for all the S sub-matrices. In this example, the pooling interface 308 applies the average pooling operation to the k-th sub matrix ($k \in \{1, \ldots, S\}$), which generates a feature vector $y^k \in R^h$, given by $$y^k = \frac{1}{d^k} \sum_i z_i^k$$

where $d^k$ is the frame size of segment S. The pooling interface 308 then applies the average pooling operation to the remaining S sub-matrices, and concatenates the results to yield a pooling output 310, represented by the feature vector $y \in R^{hS}$. In another embodiment, the pooling interface 308 applies a rectified average pooling operation to the S sub-matrices, and concatenates the results to yield a feature vector associated with all the S sub-matrices. Here, the pooling interface 308 applies an absolute value function to every component of its input to yield absolute values, such that, for example, $y_{ij}=|z_{ij}|$. The pooling interface 308 then performs the average pooling operation using the absolute values generated by the absolute value function. In another embodiment, the pooling interface 308 applies a max pooling operation to the S sub-matrices, and concatenates the result to yield a feature vector associated with all the S sub-matrices. In yet another embodiment, the pooling interface 308 applies a weighted average pooling operation to the S sub-matrices, and concatenates the results to yield a feature vector associated with all the S sub-matrices. These weights usually follow a tapering window function of time, decreasing to zero at the edge of the sub-matrix. Pooling operations other than those disclosed herein can be incorporated in order to achieve different results.

Next, the segment classifier 312 receives the pooling output 310 from the pooling interface 308. The pooling output 310 includes a group of features, such as a feature vector, which can represent the relevant features of the input over a length of time. The segment classifier 312 then generates a vector of class probabilities $p_1, p_2, p_3$ associated with one or more features in the pooling output 310. Finally, the vector of class probabilities $p_1, p_2, p_3$ can be used to select a class label for the input.

Figure 4:
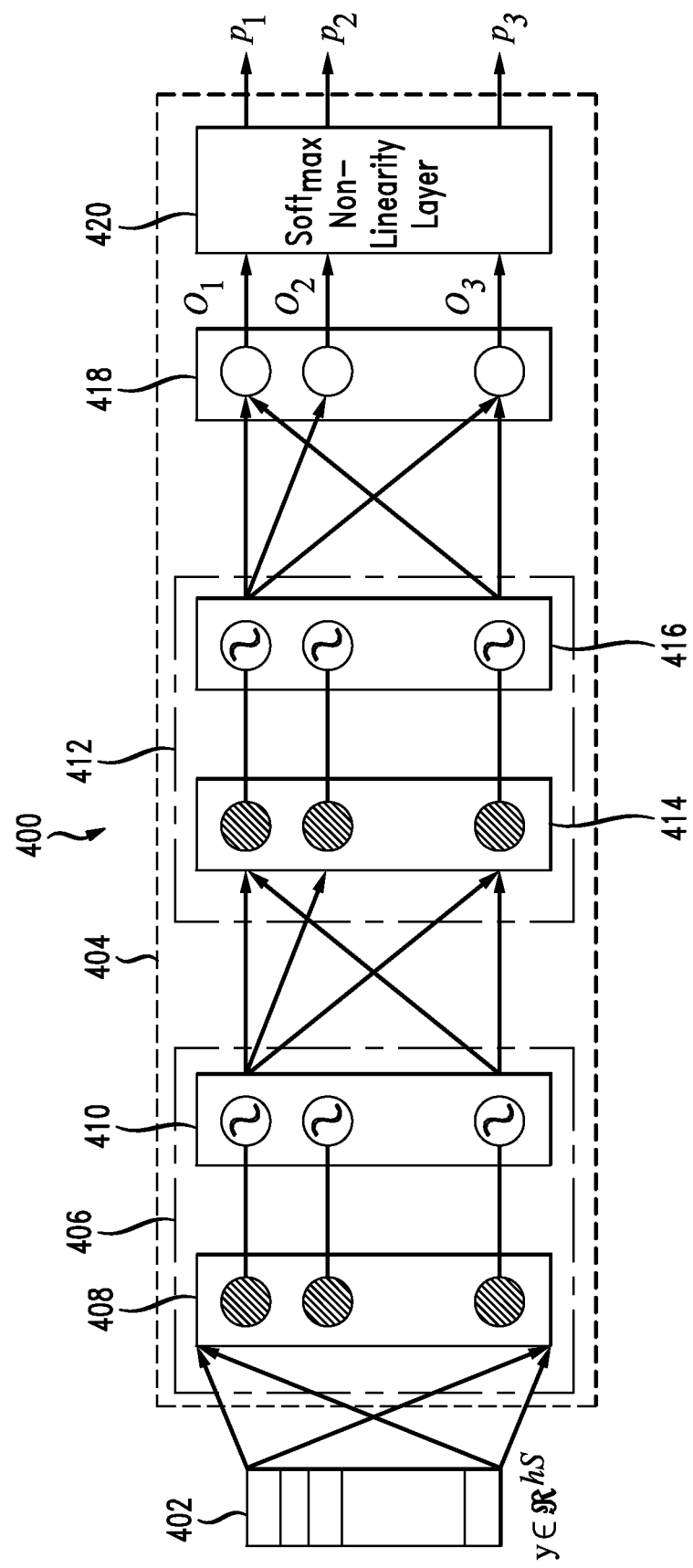
FIG. 4 illustrates an example architecture of a segmental classification unit used by the system.

FIG. 4 illustrates an example architecture of a segmental classification unit 400, such as the segment classifier 312 shown in FIG. 3, which can be implemented in a multi-layer architecture. The segmental classification unit 400 can include one or more perceptron layers. In one embodiment, the segmental classification unit 400 includes an input layer and an output layer. In another embodiment, the segmental classification unit 400 includes an input layer, an output layer, and one or more hidden layers. In FIG. 4, the segmental classification unit 400 includes two hidden perceptron layers 406, 412, one stacked on top of the other. Each of the two hidden perceptron layers 406, 412 includes a linear module 408, 414, followed by a tan h non-linearity 410, 416 applied component-wise to the respective output of the linear module 408, 414. The two hidden perceptron layers 406, 412 are followed by a fully-connected linear layer 418. The number of nodes in the fully connected linear layer 418 can be equal to the number of class labels, but can be greater or fewer.

As illustrated in FIG. 4, the segmental classification unit 400 can also include a softmax non-linearity layer 420. In this example, the outputs $O_1, O_2, O_3$ from the fully-connected linear layer 418 are passed through the softmax non-linearity layer 420, which performs a softmax function to generate the conditional probabilities of classes $p_1, p_2, p_3$. For example, let $O_j$ denote the output of the j-th unit of the fully connected linear layer 418. The class probability pi can then represent the output of the i-th unit of the softmax non-linearity layer 420, given by $$p_i = \frac{e^{oi}}{\sum_j e^{oj}}.$$

Once the softmax non-linearity layer 420 has generated the conditional probabilities of classes $p_1, p_2, p_3$, the segmental classification unit 400 can return a value based on the conditional probabilities of classes $p_1, p_2, p_3$. In one aspect, the segmental classification unit 400 returns a class label that corresponds to the highest probability from the conditional probabilities of classes $p_1, p_2, p_3$.

Figure 5:
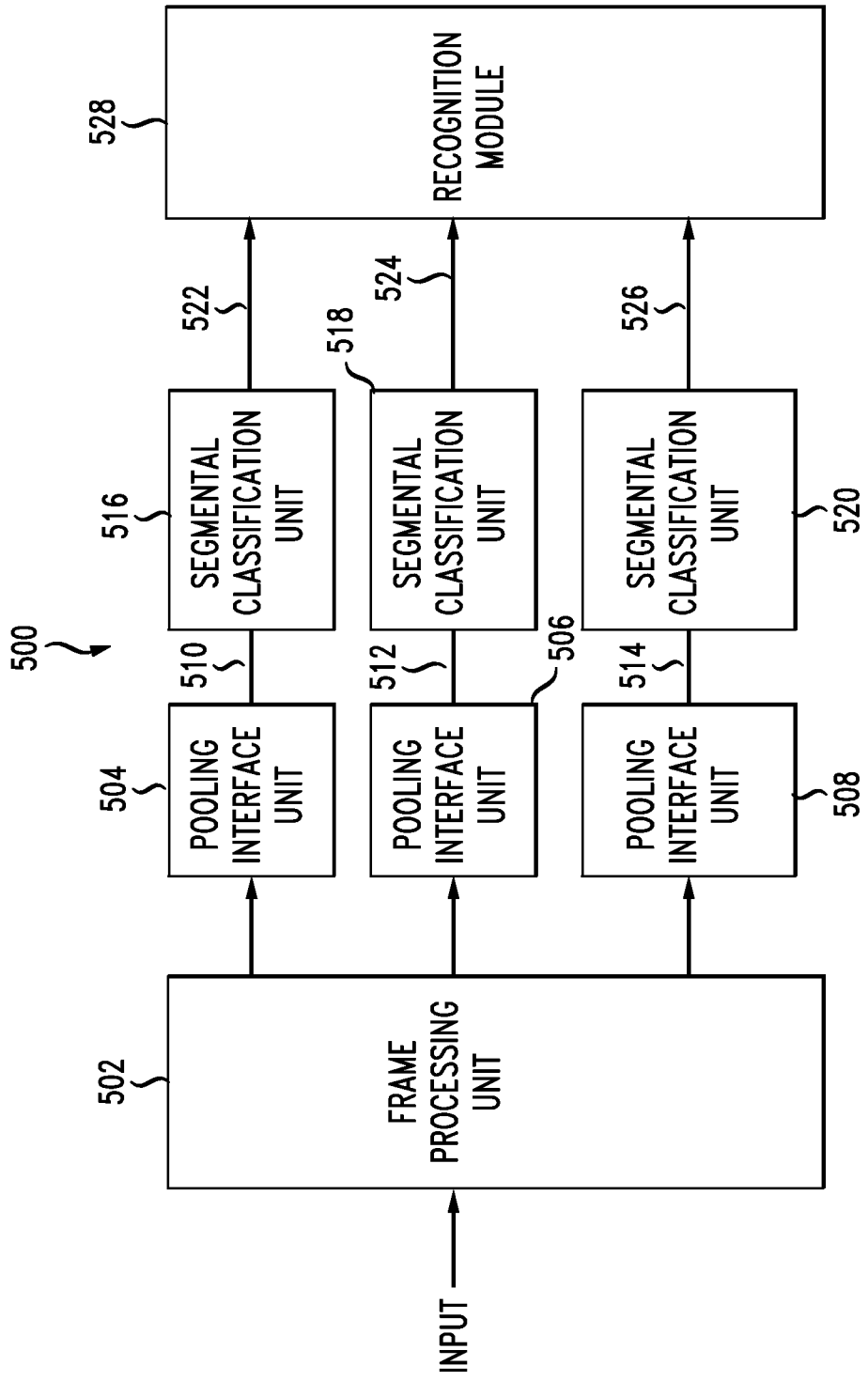
FIG. 5 illustrates an exemplary multi-layer model configured to use a set of different pooling architectures.

The disclosure now turns to FIG. 5, which illustrates an exemplary multi-layer model 500 configured to use a set of pooling architectures. The multi-layer model 500 includes a frame processing unit 502, a group of pooling interface units 504, 506, 508, a group of segmental classification units 516, 518, 520, and a recognition module 528. The multi-layer model 500 can also include additional frame processing units. Moreover, a segmental classification unit can include one or more hidden layers, but does not have to include any hidden layers. In one embodiment, the multi-layer model 500 is a multi-layer perceptron, having a frame processing unit 502 as an input layer, a plurality of pooling interface units 504, 506, 508 as a temporal integration layer, and a plurality of segmental classification units 516, 518, 520 as an output layer.

The multi-layer model 500 combines frame-based processing approaches and segment-based processing approaches for phonetic classification. As illustrated in FIG. 5, the multi-layer model 500 uses a plurality of pooling interface units 504, 506, 508 to interface the frame-based and segment-based layers of the multi-layer model 500. In FIG. 5, the frame processing unit 502 receives an input and performs frame-level transformation of the input. In one embodiment, the frame processing unit 502 performs frame-level transformation of an acoustic signal. In another embodiment, the frame processing unit 502 performs frame-level transformation of a video signal. In yet another embodiment, the frame processing unit 502 performs frame-level transformation of a data signal.

The frame processing unit 502 uses one or more temporal filters to process the input and extract the time-dependent features. In one embodiment, the frame processing unit 502 uses a Time Delay Neural Network (TDNN) to predict the values in the frame sequence. For example, the TDNN can compute values in the frame sequence as functions of the input, and generate a plurality of values as the output. This results in the frame processing unit 502 receiving the input and providing a two dimensional feature map as the output.

The plurality of pooling interface units 504, 506, 508 receive the output from the frame processing unit 502 and perform temporal pooling to extract the time-invariant features. The plurality of pooling interface units 504, 506, 508 is configured to implement various pooling strategies, which can provide a significant performance boost. For example, the plurality of pooling interface units 504, 506, 508 can include a pooling interface unit configured to select a plurality of time-dependent features based on an average pooling operation, a pooling interface unit configured to select a plurality of time-dependent features based on a rectified average pooling operation, and/or a pooling interface unit configured to select a plurality of time-dependent features based on a max pooling operation. In another embodiment, the plurality of pooling interface units each receive the output of a distinct frame processing units (there is one FPU per PIU).

The plurality of pooling interface units 504, 506, 508 can also be configured to pool the input at a partition level. Here, the input can be partitioned according to one or more partitioning schemes, and the plurality of pooling interface units 504, 506, 508 can implement one or more pooling strategies for each partitioning scheme. In one embodiment, the input is partitioned in three different ways. For example, the input can be partitioned according to a (0.5:0.25:0.25) scheme, a (0.25:0.5:0.25) scheme, and a (0.25:0.25:0.5) scheme. The pooling interface units 504, 506, 508 then pool the features in the (0.5:0.25:0.25), (0.25:0.5:0.25), and (0.25:0.25:0.5) partitions, according to one or more pooling strategies. In another embodiment, the input is partitioned in four different ways: (0.3:0.4:0.3), (0.5:0.25:0.25), (0.25:0.5:0.25), and (0.25:0.25:0.5). The pooling interface units 504, 506, 508 then pool the features in the (0.3:0.4:0.3), (0.5:0.25:0.25), (0.25:0.5:0.25), and (0.25:0.25:0.5) partitions, according to one or more pooling strategies. The above partition schemes can be modified, and additional partition schemes can be implemented to increase diversity.

Upon completion of the temporal pooling operation, the plurality of pooling interface units 504, 506, 508 generate a plurality of feature vectors 510, 512, 514. The plurality of segmental classification units 516, 518, 520 take the plurality of feature vectors 510, 512, 514 and produce a plurality of scores corresponding to the plurality of feature vectors 510, 512, 514. The plurality of segmental classification units 516, 518, 520 can also apply a function to the plurality of scores to modify the values. In one embodiment, the plurality of segmental classification units 516, 518, 520 applies a softmax function to the plurality of scores to generate a vector of class probabilities.

Each segmental classification unit in the plurality of segmental classification units 516, 518, 520 can have one or more perceptron layers. In one embodiment, one or more segmental classification units have two hidden standard perceptron layers followed by a fully connected linear layer. In another embodiment, one or more segmental classification units have a single hidden standard perceptron layer followed by a fully connected linear layer. In yet another embodiment, one or more segmental classification units have a single linear layer.

Each PIU-SCU combination can be trained separately, prior to testing, to minimize an error function. For instance, if the output score corresponds to the probability to observe a phone given the input, the error will be the distance from target scores assigned by a human labeler. In another embodiment, these target scores could be provided by another automatic labeling procedure. The procedure to modify the parameters of the system so as to minimize the error is stochastic gradient descent. Thus, each combination is trained separately, and recombined at testing time. This approach can enhance performance of the system.

Also, each segmental classification unit can optionally be dedicated to processing outputs from a specific pooling interface unit. For example, pooling interface unit 504 can be assigned to segmental classification unit 516 to form a particular pooling interface unit (PIU) and segmental classification unit (SCU) combination (e.g., PIU 504-SCU 516). Here, the multi-layer model 500 can include one or more PIU-SCU combinations. In one embodiment, the multi-layer model 500 includes an ensemble of 60 PIU-SCU combinations. In this example, the input is partitioned in four different ways: (0.3:0.4:0.3), (0.5:0.25:0.25), (0.25:0.5:0.25), and (0.25:0.25:0.5). Five PIU-SCU combinations are then configured for each partitioning scheme, yielding twenty PIU-SCU combinations, where each PIU-SCU combination is configured to start with a different set of initial parameters. The twenty PIU-SCU combinations are then configured to implement an average pooling operation for each partition. A second set of twenty PIU-SCU combinations is then configured to implement a rectified average pooling operation for each partition. Finally, a third set of twenty PIU-SCU combinations is configured to implement a sum pooling operation for each partition. The combined first, second, and third sets of twenty PIU-SCU combinations make up the ensemble of 60 PIU-SCU combinations.

Next, the plurality of segmental classification units 516, 518, 520 selects a plurality of class labels 522, 524, 526 based on the plurality of scores. In one embodiment, the plurality of segmental classification units 516, 518, 520 selects the plurality of class labels 522, 524, 526 corresponding to the highest probabilities. In yet another embodiment, the plurality of segmental classification units 516, 518, 520 selects a plurality of recognition candidates based on the plurality of scores. Finally, the recognition module 528 returns a result based on the plurality of class labels 522, 524, 526. The result can be a class label, vector of class labels, recognition candidate, representation of the input, etc.

Figure 6:
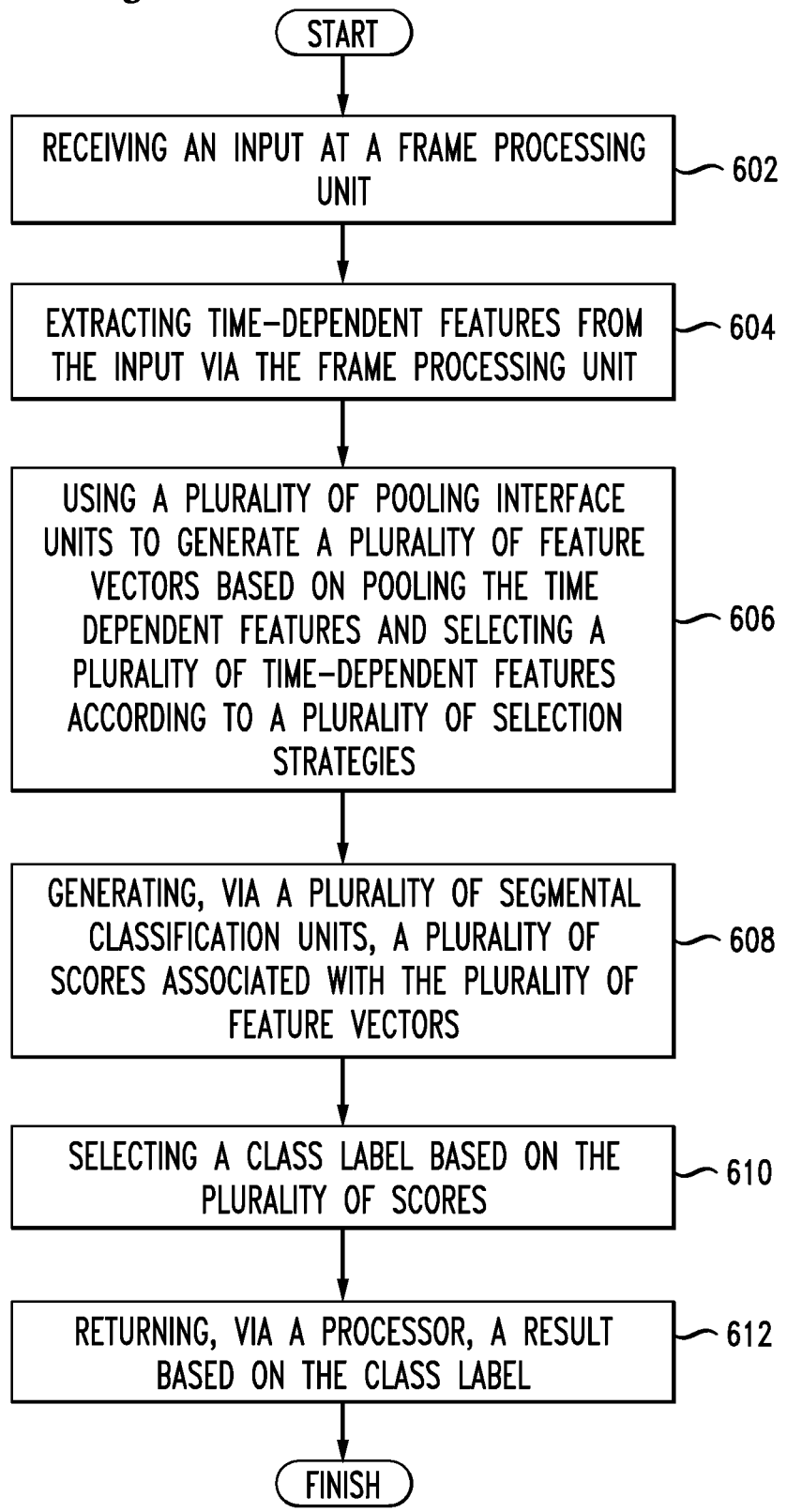
FIG. 6 illustrates an example method embodiment.

Having disclosed some basic system components and concepts, the disclosure now turns to the exemplary method embodiment shown in FIG. 6. For the sake of clarity, the methods are discussed in terms of an exemplary system 100 as shown in FIG. 1 configured to practice the respective methods. The steps outlined herein are exemplary and can be implemented in any combination thereof, including combinations that exclude, add, or modify certain steps.

FIG. 6 illustrates an example method embodiment. The system 100 receives an input at a frame processing unit (602). The input can be, for example, a signal. Moreover, the input can include images, data, audio, video, and so forth. The input can also include a sequence of frames in a segment of video, audio, images, and so forth. The input can be pre-segmented to include a sequence of segments, each segment corresponding to a portion of the input. In one embodiment, the input is a sequence of frames associated with a phone segment. In another embodiment, the input is a sequence of features associated with a group of frames extracted from pre-segmented phone segments.

The system 100 extracts time-dependent features from the input via the frame processing unit (604). The frame processing unit can include one or more temporal filters. In one embodiment, the frame processing unit includes one temporal filter. In another embodiment, the frame processing unit includes a temporal filter bank. In yet another embodiment, the frame processing unit includes a temporal filter bank followed by a point-wise non-linearity.

In one embodiment, the frame processing unit takes as input a two-dimensional feature map and uses a temporal filter bank to produce as output another two-dimensional feature map which represents the time-dependent features from the input. For example, the frame processing unit can take as input a two-dimensional feature map represented as a matrix $X \in \Re^{d \times T}$, where d represents the d dimensional frames and T represents the number of frames associated with the input, such that $X=[x_1, x_2, \ldots, x_T]$, where the j-th column of X represents the feature vector $x_j$, corresponding to the frame j. Here, the value associated with the i-th filter's output feature map at time t is a convolution using a filter of width k: $z_{it} = \sum_{j=1}^{k} w_{ij} \cdot x_{t+j}$, $\forall 1 \leq t \leq T-k+1$, where $w_{ij} \in \Re^d$ ($1 \leq j \leq k$) are the parameters associated with the i-th filter. If h is the number of filters in the filter bank, the value associated with the filter bank's output feature map at time t can then be represented by $z_t = \sum_{j=1}^{k} W_j \cdot x_{t+j}$, where $W_j \in \Re^{h \times d}$ ($1 \leq j \leq k$) are the parameter matrices, and $z_t \in \Re^h$ is the hidden representation of the input at time t. Thus, the output from the frame processing unit can be the two-dimensional feature map $Z=[z_1, z_2, \ldots, z_{(T-k+1)}]$, with $Z \in \Re^{h \times (T-k+1)}$. In one aspect, each element of the two-dimensional feature map Z is passed through a point-wise non-linearity. For example, the two-dimensional feature map Z can be passed through a hyperbolic tangent function: $y_{ij} = \tan h(z_{ij})$.

Next, the system 100 uses a plurality of pooling interface units to generate a plurality of feature vectors based on pooling the time-dependent features and selecting a plurality of time-dependent features according to a plurality of selection strategies (606). Each pooling interface unit is configured to combine the time-dependent features extracted by the frame processing unit and select a plurality of time-dependent features according to a selection strategy. A selection strategy can be based, for example, on an average, rectified average, or max score.

In one embodiment, the plurality of pooling interface units includes a pooling interface unit configured to select a plurality of time-dependent features based on an average pooling operation, a pooling interface unit configured to select a plurality of time-dependent features based on a rectified average pooling operation, and a pooling interface unit configured to select a plurality of time-dependent features based on a max pooling operation. In another embodiment, the plurality of pooling interface units includes two pooling interface units configured to select a plurality of time-dependent features based on an average pooling operation, and three pooling interface units configured to select a plurality of time-dependent features based on a rectified average pooling operation.

The plurality of pooling interface units can also be configured to divide the output generated by the frame processing unit before beginning the pooling operation. For example, the plurality of pooling interface units can be configured to receive the two-dimensional feature map Z outputted by the frame processing unit, and divide the matrix Z along its columns into S non-overlapping, contiguous sub-matrices. The plurality of pooling interface units can then combine the time-dependent features extracted by the frame processing unit, and select a plurality of time-dependent features according to a selection strategy to yield a plurality of feature vectors. In one embodiment, the plurality of pooling interface units combines the time-dependent features in the sub-matrices, and selects a plurality of time-dependent features for each of the sub-matrices to yield a plurality of feature vectors. Here, each pooling interface unit from the plurality of pooling interface units can generate a plurality of feature vectors, where each feature vector is associated with a particular sub-matrix. Each pooling interface unit can then concatenate the plurality of feature vectors associated with each of the sub-matrices, to yield a feature vector associated with the S sub-matrices.

The system 100 then generates, via a plurality of segmental classification units, a plurality of scores associated with the plurality of feature vectors (608). The scores can be, for example, class probabilities. In one embodiment, the plurality of segmental classification units receives as input a plurality of feature vectors generated by the plurality of pooling interface units, and generates a vector of class probabilities associated with each phone class in a plurality of phone classes. In another embodiment, the plurality of segmental classification units receives as input a plurality of feature vectors generated by the plurality of pooling interface units, and generates a plurality of confidence scores associated with the plurality of feature vectors.

Next, the system 100 selects a class label based on the plurality of scores (610). After selecting the class label, the system 100 returns a result based on the class label. In one embodiment, the system 100 returns a class label. In another embodiment, the system 100 returns a recognition candidate. In yet another embodiment, the system 100 returns a representation of the input.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to speech recognition in any situation, as well as video recognition, image recognition, content recognition, object recognition, character recognition, and so forth. Those skilled in the art will readily recognize various modifications and changes that may be made to the principles described herein without following the example embodiments and applications illustrated and described herein, and without departing from the spirit and scope of the disclosure.

We claim:

1. A method comprising:
   extracting time-dependent features from an input, to yield extracted time-dependent features;
   selecting a plurality of time-dependent features from the extracted time-dependent features using a plurality of selection strategies, wherein a plurality of pooling interface units select the plurality of time-dependent features based on a weighted average score and on a rectified average score of the extracted time-dependent features;
   generating a plurality of feature vectors by pooling the plurality of time-dependent features using a plurality of pooling interface units;
   generating a plurality of scores associated with the plurality of feature vectors; and
   returning, in response to the input, a class label selected based on the plurality of scores.

2. The method of claim 1, wherein the input comprises a sequence of frames in a segment of one of a video, an audio, and an image.

3. The method of claim 1, wherein the input comprises a segmented stream of one of video, audio, images, and data.

4. The method of claim 1, wherein the input comprises a signal.

5. The method of claim 1, wherein the selecting of the plurality of time-dependent features is further based on a maximum score.

6. The method of claim 1, further comprising generating a plurality of partitions associated with the plurality of time-dependent features according to a plurality of partitioning strategies.

7. The method of claim 6, wherein a selection strategy from the plurality of partitioning strategies is based on a plurality of partition scores, wherein the plurality of partition scores corresponds to the plurality of partitions.

8. The method of claim 1, wherein the weighted average score tapers as a function of time.

9. The method of claim 1, further comprising concatenating the plurality of feature vectors, to yield a master feature vector associated with all feature vectors in the plurality of feature vectors.

10. A system comprising:
    a processor; and
    a computer-readable storage medium having instructions stored which, when executed by the processor, result in operations comprising:
      extracting time-dependent features from an input, to yield extracted time-dependent features;
      selecting a plurality of time-dependent features from the extracted time-dependent features using a plurality of selection strategies, wherein a plurality of pooling interface units select the plurality of time-dependent features based on a weighted average score and on a rectified average score of the extracted time-dependent features;
      generating a plurality of feature vectors by pooling the plurality of time-dependent features using a plurality of pooling interface units;
      generating a plurality of scores associated with the plurality of feature vectors; and
      returning, in response to the input, a class label selected based on the plurality of scores.

11. The system of claim 10, wherein the input comprises a sequence of frames in a segment of one of a video, an audio, and an image.

12. The system of claim 10, wherein the input comprises a segmented stream of one of video, audio, images, and data.

13. The system of claim 10, wherein the input comprises a signal.

14. The system of claim 10, wherein the selecting of the plurality of time-dependent features is further based on a maximum score.

15. The system of claim 10, the computer-readable storage medium having additional instructions stored which, when executed by the processor, result in operations comprising generating a plurality of partitions associated with the plurality of time-dependent features according to a plurality of partitioning strategies.

16. The system of claim 15, wherein a selection strategy from the plurality of partitioning strategies is based on a plurality of partition scores, wherein the plurality of partition scores corresponds to the plurality of partitions.

17. The system of claim 10, wherein the weighted average score tapers as a function of time.

18. The system of claim 10, the computer-readable storage medium having additional instructions stored which, when executed by the processor, result in comprising concatenating the plurality of feature vectors, to yield a master feature vector associated with all feature vectors in the plurality of feature vectors.

19. A computer-readable storage device having instructions stored which, when executed by a computing device, result in operations comprising:
- extracting time-dependent features from an input, to yield extracted time-dependent features;
- selecting a plurality of time-dependent features from the extracted time-dependent features using a plurality of selection strategies, wherein a plurality of pooling interface units select the plurality of time-dependent features based on a weighted average score and on a rectified average score of the extracted time-dependent features;
- generating a plurality of feature vectors by pooling the plurality of time-dependent features using a plurality of pooling interface units;
- generating a plurality of scores associated with the plurality of feature vectors; and
- returning, in response to the input, a class label selected based on the plurality of scores.

20. The computer-readable storage device of claim 19, wherein the input comprises a sequence of frames in a segment of one of a video, an audio, and an image.

* * * * *